US012803325B2

(12) United States Patent
Höhler

(10) Patent No.: US 12,803,325 B2
(45) Date of Patent: Nov. 17, 2026

(54) MONITORING SYSTEM AND METHOD FOR MONITORING A VOLTAGE NETWORK

(71) Applicant: DEHN SE, Neumarkt i.d. OPf. (DE)

(72) Inventor: Christian Höhler, Neumarkt (DE)

(73) Assignee: DEHN SE, Neumarkt i.d.OPf. (DE)

( * ) Notice: Subject to any disclaimer, the term of this patent is extended or adjusted under 35 U.S.C. 154(b) by 153 days.

(21) Appl. No.: 18/842,314

(22) PCT Filed: Mar. 1, 2023

(86) PCT No.: PCT/EP2023/055190

§ 371 (c)(1),
(2) Date: Aug. 28, 2024

(87) PCT Pub. No.: WO2023/166063

PCT Pub. Date: Sep. 7, 2023

(65) Prior Publication Data

US 2025/0192607 A1 Jun. 12, 2025

(30) Foreign Application Priority Data

Mar. 4, 2022 (DE) ..................... 10 2022 105 141.2

(51) Int. Cl.
*H02J 13/12* (2026.01)
*H02H 1/00* (2006.01)
(Continued)

(52) U.S. Cl.
CPC ........... *H02J 13/12* (2026.01); *H02H 1/0061* (2013.01); *H02H 1/0092* (2013.01);
(Continued)

(58) Field of Classification Search
CPC ............ H02J 13/12; H02J 13/10; H02J 13/13; H02H 1/0061; H02H 1/0092; H02H 9/042;
(Continued)

(56) References Cited

U.S. PATENT DOCUMENTS 4,912,589 A * 3/1990 Stolarczyk ............... H02H 9/04 337/28
7,933,106 B2 * 4/2011 Brown ................... H02H 9/042 361/111
(Continued)

FOREIGN PATENT DOCUMENTS

CN 113049901 A * 6/2021 ............. G01R 31/52
DE 102018114181 A1 8/2019 .............. H02J 13/00
(Continued)

OTHER PUBLICATIONS

Lee H: KR 2021081200; Title: Artificial Intelligence Based Surge Protector Monitoring Device For Monitoring Surge Protector Connected Between Wiring Breaker Connected To Electrical Wiring In Building Comprises Data Collection Unit That Collect Data Related To Operation: Entire specification/drwaings. (Year: 2021).*
(Continued)

*Primary Examiner* — Dharti H Patel
(74) *Attorney, Agent, or Firm* — Bodner & Bodner, PLLC; Christian P. Bodner; Gerald T. Bodner

(57) ABSTRACT

A monitoring system for monitoring a voltage grid (12) has a protection device (16) which is to be incorporated into the voltage grid (12) and which comprises at least one triggering protection component (18). The protection device (16) has at least one communication interface (26), which is configured to transmit a state value of the protection device (16) to an evaluation unit (30) that is formed separately from the protection device (16) and is configured to perform an evaluation, so that an outsourced evaluation is provided. In addition, a method of monitoring a voltage grid (12) is described.

14 Claims, 1 Drawing Sheet

Figure 1:
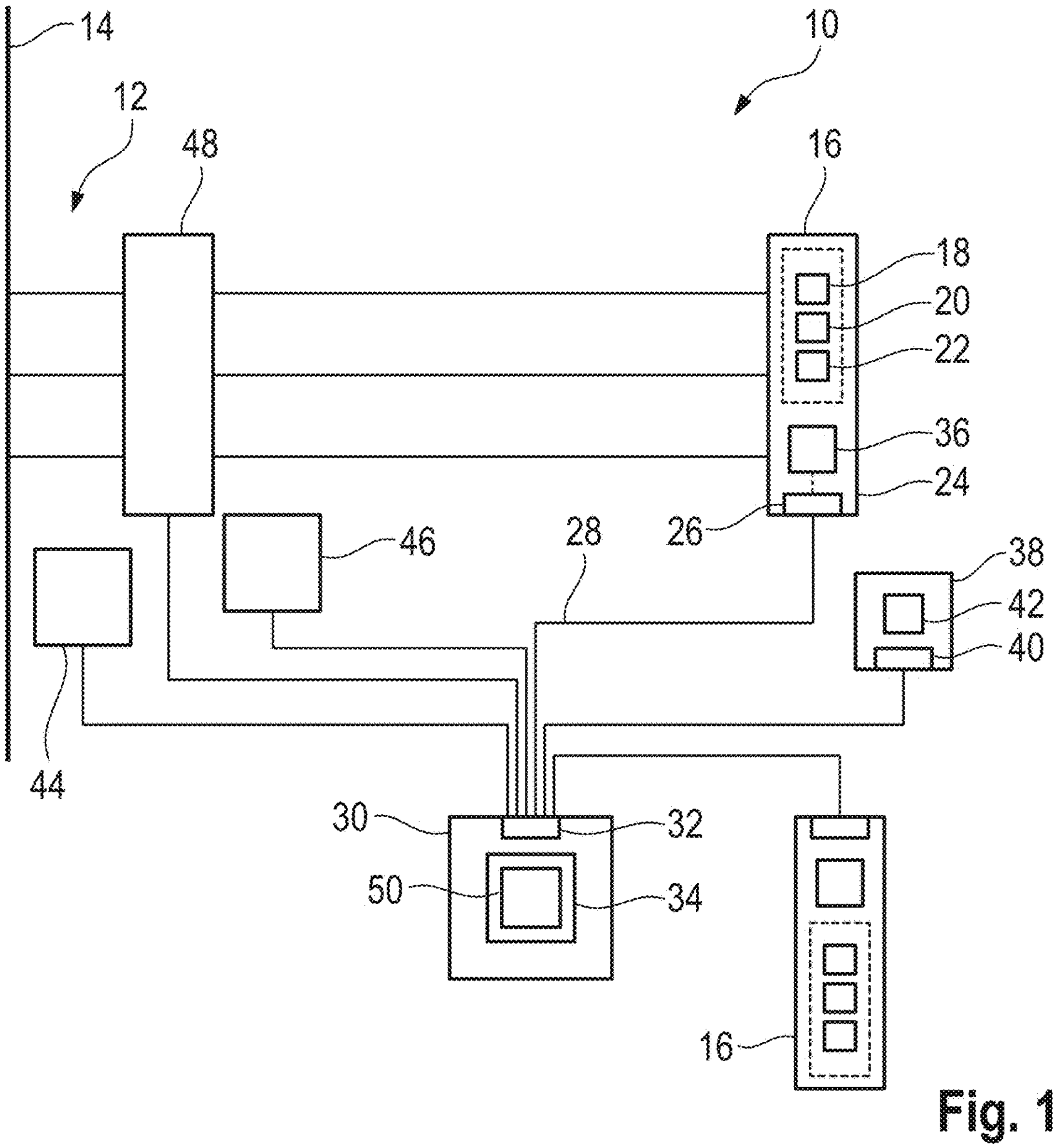

(51) Int. Cl.

| | |
|---|---|
| ***H02H 9/04*** | (2006.01) |
| ***H02H 9/06*** | (2006.01) |
| ***H02J 13/10*** | (2026.01) |
| ***H02J 13/13*** | (2026.01) |

(52) U.S. Cl.
CPC .............. *H02H 9/042* (2013.01); *H02H 9/06* (2013.01); *H02J 13/10* (2026.01); *H02J 13/13* (2026.01)

(58) Field of Classification Search
CPC ...... H02H 9/06; H02H 3/048; G01R 19/2513; G01R 31/2827; H01T 1/12
See application file for complete search history.

(56) References Cited

U.S. PATENT DOCUMENTS

| | | | | |
|---|---|---|---|---|
| 8,982,525 | B2 * | 3/2015 | Durth | H01C 7/12 361/111 |
| 9,557,720 | B1 * | 1/2017 | Woods | G01R 19/02 |
| 9,784,785 | B2 * | 10/2017 | Farquhar, III | G01K 13/00 |
| 10,673,226 | B2 * | 6/2020 | Louco | H02H 1/0092 |
| 11,735,890 | B2 | 8/2023 | Strangfeld et al. | 361/118 |
| 2011/0026179 | A1 * | 2/2011 | Kasper | H02H 9/042 361/91.5 |
| 2013/0128396 | A1 * | 5/2013 | Danesh | G01R 23/02 361/45 |
| 2014/0268458 | A1 * | 9/2014 | Luciani | H02H 1/043 361/87 |
| 2016/0161547 | A1 * | 6/2016 | Farquhar, III | G01K 13/00 324/549 |
| 2019/0123544 | A1 * | 4/2019 | Pelegris | H02H 11/002 |
| 2019/0237964 | A1 * | 8/2019 | Bandel | H02H 9/045 |
| 2020/0036185 | A1 * | 1/2020 | Tsovilis | H02H 9/06 |
| 2020/0292608 | A1 | 9/2020 | Yan et al. | |
| 2020/0408816 | A1 | 12/2020 | Ehrler et al. | |
| 2022/0337081 | A1 * | 10/2022 | Davies | H02J 13/13 |
| 2023/0223749 | A1 * | 7/2023 | Polychronakis | H02H 9/041 361/56 |

FOREIGN PATENT DOCUMENTS

| | | | | |
|---|---|---|---|---|
| DE | 102019110745 | B3 | 10/2020 | H01H 37/08 |
| EP | 2333925 | A1 | 6/2011 | H02H 9/04 |
| EP | 2549613 | A1 * | 1/2013 | H02H 9/041 |
| EP | 4287429 | A1 * | 12/2023 | H02H 9/06 |
| WO | WO2016026522 | A1 | 2/2016 | G01D 5/12 |

OTHER PUBLICATIONS

Zhou Qibin, et al., "*Research Progress of Intelligent Lightning Protection Based on Internet of Things Technology*", 2020 International Conference On Sensing, Measurement & Data Analytics In The Era Of Artificial Intelligence (ICSMD), IEEE, Oct. 15, 2020, pp. 459-463, XP033863326. Abstract and text available at: https://ieeexplore.ieee.org/document/9261632 (last accessed on Jan. 3, 2025) (copy not enclosed).

Notification Concerning Transmittal of International Preliminary Report on Patentability (Chapter I of the Patent Cooperation Treaty), in English, dated Sep. 19, 2024, which was issued by the International Bureau of WIPO in Applicant's corresponding international PCT application having Serial No. PCT/EP2023/055190, filed on Mar. 1, 2023.

English translation of the International Preliminary Report on Patentability (Chapter I of the Patent Cooperation Treaty), dated Sep. 10, 2024, which was issued by the International Bureau of WIPO in Applicant's corresponding international PCT application having Serial No. PCT/EP2023/055190, filed on Mar. 1, 2023.

Written Opinion of the International Searching Authority, in English, dated Jun. 30, 2023, which was issued by the International Bureau of WIPO in Applicant's corresponding international PCT application having Serial No. PCT/EP2023/055190, filed on Mar. 1, 2023.

International Search Report, in English, dated Jun. 30, 2023, which was issued by the International Bureau of WIPO in Applicant's corresponding international PCT application having Serial No. PCT/EP2023/055190, filed on Mar. 1, 2023.

* cited by examiner

MONITORING SYSTEM AND METHOD FOR MONITORING A VOLTAGE NETWORK

The invention relates to a monitoring system for monitoring a voltage network or grid. The invention further relates to a method of monitoring a voltage network or grid by means of a monitoring system.

A variety of protection devices are known from the prior art, for example surge protection devices (SPDs), which are also referred to as surge arresters. Protection devices of this type are incorporated into a voltage grid to be monitored and protected, for example a low-voltage grid, which is also referred to as a building grid.

In the event of an overvoltage, for example due to a lightning event, the protection device serves to discharge the existing overvoltage in order to protect any devices present in the voltage grid from the effects of overvoltage. To this end, the protection device usually includes at least one triggering protection component that responds in the event of an overvoltage and assumes a conducting or quasi-conducting state, causing the overvoltage to be discharged because an associated current flows. The triggering protection component is therefore also referred to as a disconnecting device, wherein it is in the form of a spark gap, for example.

Typically, protection devices of this type include an indicator element that indicates the respective state of the protection device, for example by means of a mechanically alterable indicator element that is green or red, with the respective color depending on the state of the protection device, in particular the state of the triggering protection component. Such an overvoltage device is known, for example, from DE 10 2019 110 745 B3.

WO 2016/026522 A1 discloses a surge protection device which, like the protection device of DE 10 2019 110 745 B3, performs an evaluation or diagnosis. To this end, the surge protection device of WO 2016/026522 A1 includes a diagnostic circuit that performs an evaluation or diagnosis to then send the result of the diagnosis or evaluation to a controller.

The protection devices known from the prior art are, however, only designed to safely and reliably reduce an existing overvoltage in order to avoid overloading of the voltage grid and to enable operation to resume as quickly as possible once the overvoltage event no longer exists. In addition, the current state of the protection device is indicated on site so that a user is informed of the current state. However, such protection devices do not allow additional findings to be obtained.

It is therefore the object of the invention to further develop such protection devices so that more information is provided.

According to the invention, the object is achieved by a monitoring system for monitoring a voltage grid, the monitoring system including a protection device which is to be incorporated into the voltage grid and which comprises at least one triggering protection component. The protection device includes at least one communication interface that is configured to transmit a state value of the protection device to an evaluation unit formed separately from the protection device. The evaluation unit is configured to perform an evaluation, so that an evaluation is available that is outsourced from the protection device.

The fundamental idea of the invention is to provide an outsourced evaluation, which allows the protection device itself to be designed so as to save space. The intelligence and/or computing power required for the evaluation, by contrast, can be implemented in an evaluation unit formed separately from the protection device, whereby an external logic is provided which communicates with the at least one protection device to be incorporated into the voltage grid, for example via a computer network such as the Internet. The outsourced evaluation thus ensures that the evaluation of the state value transmitted by the protection device is performed outside the protection device. This evaluation is also referred to as diagnostics.

Accordingly, the state value is transmitted to the separately configured evaluation unit in the form of data. Transmission protocols such as TCP may be used for this purpose, in particular TCP/IP.

In any case, due to the evaluation unit being formed separately, it is possible for it to have a suitably high computing power, which means that complex evaluations can also be carried out, which would be impossible to implement in a conventional protection device. One of the reasons for this is that only a small amount of installation space is available at the installation site, typically in the area of a top-hat rail.

Generally, the monitoring system may comprise a plurality of protection devices, which are incorporated in the same voltage grid or in different voltage grids. The plurality of protection devices can send data to the same evaluation unit, in particular communicate with the evaluation unit. This allows the separately formed evaluation unit to obtain a plurality of state values from different protection devices, as a result of which the evaluation unit has more data and information available that can be made use of in the evaluation.

In this way, the evaluation can be carried out on the basis of a correspondingly large data base. This allows correlations between different data to be identified.

For example, correlations can be identified based on the joint evaluation of different state values that were obtained from different protection devices.

The triggering protection component may be a horn gap or spark gap that changes to a conductive or quasi-conductive state in the event of an overvoltage being applied.

One aspect provides that the state value of the protection device is a measured value acquired by the protection device or a value representative of a triggering state of the triggering protection component of the protection device. The protection device may, for example, include a measuring and/or sensor unit by means of which the respective measured value is captured. In particular, the measured value is a value of a characteristic parameter of the voltage grid. The state of the voltage grid can be determined based on the characteristic parameter.

Generally, the characteristic parameter may be a voltage, a current, a power, a frequency, a distortion, a harmonic, a reactive power and/or an energy value of the voltage grid, in particular of a phase of a multiphase voltage grid.

In particular, provision is made for the protection device to include a plurality of measuring and/or sensor units. In this respect, it is possible for a plurality of characteristic parameters of the voltage grid to be determined and transmitted to the evaluation unit in order to thereby allow a more precise evaluation by means of the separately formed evaluation unit.

The value representative of a triggering state of the triggering protection component of the protection device may be a binary value. In this respect, "0" may stand for the non-tripped state of the protection component, whereas "1" stands for the tripped state of the triggering protection component. Accordingly, the protection device can transmit, via the communication interface, by means of the representative value whether or not the triggering protection component has tripped, that is, whether or not there is an overvoltage event.

A further aspect provides that the protection device is an overvoltage or surge protection device. In this respect, the protection device may be in the form of a surge protection device (SPD). The protection device therefore serves to discharge an overvoltage so that any devices and components integrated within the voltage grid are safely and efficiently protected from the overvoltage. Since the protection device furthermore includes the communication interface which the protection device uses to transfer data to the separately formed evaluation unit, it is ensured that respective information regarding the state of the protection device, i.e. a triggering state, and/or a measured value acquired by the protection device is/are transmitted to the separately formed evaluation unit, which is configured to perform an appropriate evaluation in order to carry out in-depth analyses.

In addition to the triggering protection component, the protection device may comprise a voltage-limiting protection component. For example, the voltage-limiting protection component is a metal oxide varistor. The triggering protection component and the voltage-limiting protection component may be connected in series.

According to a further aspect, it is provided that the system comprises an evaluation unit which is formed separately from the protection device and which includes at least one communication interface that is configured to communicate with the communication interface of the protection device. The communication interface, that is, the communication interface of the protection device and/or the communication interface of the evaluation unit, may be formed as a bidirectional communication interface. In this respect, in addition to the protection device, the monitoring system also comprises the separately formed evaluation unit, which communicates with the protection device. The evaluation unit and/or the protection device may each include a bidirectional communication interface so that data can be received and data can be sent. This results in bidirectional communication between the protection device and the evaluation unit.

As an alternative, provision may be made that the protection device includes two separate communication interfaces and/or the evaluation unit includes two separate communication interfaces, which means that in each case unidirectional communication or data transfer takes place between the corresponding communication interfaces. This may be of importance if the data transfer in at least one direction is intended to have a higher security requirement than the data transfer in the respective other direction.

Generally, the evaluation unit may be a server-based evaluation unit, for example a cloud system. In this respect, it is possible for the protection device to transmit the at least one state value to a cloud that is connected for communication with a plurality of devices, in particular a plurality of protection devices. In particular, it is therefore possible for the evaluation unit to obtain data that can be used for evaluation from a large number of devices, that is, including devices other than the protection devices. In addition, it is possible that separate access to the server-based evaluation unit is made possible so that an authorized user has access to relevant data that has been transmitted from the at least one protection device to the server-based evaluation unit. In other words, it is possible for a user or operator of the monitoring system to have access to the evaluation results that are contained in the cloud. It is therefore possible that the evaluation results determined by the evaluation unit are available in the cloud so that they can be retrieved. But it is also possible that the evaluation results are transmitted by the evaluation unit to the protection device, for example, so that the evaluation results are available directly on site.

According to a further aspect, it is provided that the evaluation unit is configured to receive input data from at least one database or from a measuring device. This is of importance in particular if the evaluation unit is a server-based evaluation unit that communicates with a plurality of devices that are installed at different locations. In particular, it is possible that data, providing additional information, of a database is included in the evaluation, thereby improving the evaluation of the state value of the protection device.

This data may be weather, climate or environmental data in general. In particular, lightning events or the like may be incorporated from a database, which improves the evaluation of the state value of the protection device accordingly. Time data (working day, weekend, public holiday, day and/or night) or usage data of systems in the surrounding area may also be obtained from the database, for example a timetable for trains or usage data of electric charging systems in the surrounding area.

The further measuring device may be a device that is directly incorporated in the voltage grid but has no protective function for the voltage grid, for example a simple current or voltage measuring device. In addition, the measuring device may be a device that measures a quantity that is independent of the voltage grid, for example a humidity sensor or an ambient temperature sensor or the like.

The monitoring system may therefore include at least one second quantity in the evaluation, in addition to the state value that is transmitted by the protection device incorporated in the voltage grid. The second quantity may be a value from a database, a measured value or a characteristic parameter of the voltage grid.

In this respect, the monitoring system may comprise at least one database and/or an additional measuring device.

Furthermore, the evaluation unit may include at least one processor unit which is configured to process at least the state value obtained from the protection device. The processor unit may be configured to execute algorithms in order to determine an evaluation result based on the state value obtained, for example an output value or a state, in particular a state characterizing the voltage grid or the protection device.

This may be a (current) aging state of the protection device or a (current) state of the voltage grid, i.e. the grid state of the voltage grid.

However, the respective state may also be predicted, which means that a future aging state of the protection device or a future state of the voltage grid is predicted, in which at least the state value of the protection device is processed by means of the evaluation unit. This allows, for example, the future grid quality and aging-related problems to be predicted so that appropriate countermeasures can be initiated in good time.

In particular, the processor unit comprises an artificial intelligence which is configured to predict a state of the voltage grid and/or a state of the protection device on the basis of the state value obtained from the protection device. This may be a failure prediction of this protection device or a state prediction of the voltage grid which is based on data that has been acquired so far relating to the voltage grid and that has been transmitted to the evaluation unit by the at least one protection device, in particular additionally by further devices and/or the database.

Using the artificial intelligence, large amounts of data, in particular of different types, can be processed and relationships (correlations) between the different data can be identified, so that in-depth analyses are possible.

In this respect, the evaluation unit, in particular the processor unit comprising the artificial intelligence, can therefore predict future states on the basis of historical data in order to thereby allow the user or operator to initiate suitable countermeasures in good time to counteract a predicted poor grid quality (state) of the voltage grid or a predicted fault of the protection device in good time. For example, it is possible for an impending failure of the protection device to be detected at an early stage so that the protection device is replaced in good time, as a result of which there is no or only a minimum downtime, since the replacement device is already in stock or the protection device is already replaced before the actual failure.

Furthermore, the separately formed evaluation unit may be configured to determine an evaluation result based on the state value of the protection device, in particular an output value and/or a state. That is, the evaluation unit processes the state value transmitted by the protection device to obtain, on this basis, the evaluation result that is comprehensible to the user, for example the output value or the state.

In addition, the separately formed evaluation unit may be configured to transmit the evaluation result determined to the protection device or a display device. This allows the evaluation result (which is easy to understand for the user) to be output on the protection device itself or on a display device arranged in the installation area of the protection device. This ensures that the user is informed about the protection device, in particular its state, at the location of the protection device.

A further aspect provides that the protection device includes at least one display that is configured to display an evaluation result of the evaluation unit. The display may be a digital display, for example in the form of a screen or at least one LED. A plurality of LEDs may be provided, in particular multicolored ones, for example red, yellow or orange, and green. In particular, the display is connected to the communication interface of the protection device in a signal-transmitting manner, so that the data received via the communication interface and corresponding to the evaluation result is converted by the protection device in order to control the display, i.e. the screen or the LED(s). The evaluation unit therefore transmits the evaluation result to the protection device so that the evaluation result can be displayed at the location of the protection device.

Alternatively, the display may also be a mechanical display, for example a flap or a slider, which is moved mechanically to display the evaluation result, in particular by a red or a green area becoming visible. The mechanical display is also controlled (indirectly) based on the data that is obtained from the communication interface and that corresponds to the evaluation result, since the protection device converts it accordingly, for example to control an actuator that interacts with the mechanical display.

Furthermore, the monitoring system may include a display that is formed separately from the protection device, for example in a separately formed display device. The display device may be associated with the voltage grid in which the protection device is incorporated. This makes it possible for a display or a notification to be provided at a location that is more easily accessible or more frequently visited than is the case, for example, in an installations room where the protection device is usually installed. This ensures that a user or operator of the monitoring system receives appropriate information from the evaluation unit in a timely and reliable manner, for example an appropriate recommendation for action to counteract a failure of the protection device or a predicted poor state of the voltage grid.

It is basically possible for the display to provide further information, in particular also recommendations for action. They can be indicated on the display, which may prompt a user or operator of the monitoring system to implement appropriate measures.

There is no direct signal transmission between the at least one triggering protection component and the display, i.e. neither a wired connection, a signal line nor a wireless connection, via which signals are transmitted. Ultimately, the measured value or the value representative of the triggering state of the triggering protection component of the protection device is acquired and transmitted by the protection device via the communication interface to the separately formed evaluation unit, which communicates with the protection device in order to transmit the evaluation result that is to be output by means of the display. In this respect, no direct data transmission is provided between the triggering protection component of the protection device and the display of the protection device, but only an indirect transmission through the separately formed evaluation unit, which communicates with the at least one communication interface.

The protection device may include a housing, in which at least the triggering protection component and the communication interface are at least partially accommodated. In this respect, the protection device is a structural part which comprises the respective components and protects them from the environment.

Moreover, the invention provides a method of monitoring a voltage grid by means of a monitoring system, the method comprising the steps of:

- acquiring a state value by means of a protection device which is incorporated in the voltage grid to be monitored;
- transmitting the acquired state value to an evaluation unit that is formed separately from the protection device; and
- processing the transmitted state value by means of the evaluation unit, so that an outsourced evaluation is effected.

In this regard, it is ensured that the state value acquired by the protection device can be processed using complex evaluation techniques in order to determine an output value or to predict a state of the protection device or of the voltage grid. The evaluation result, for example the appropriately determined output value or the predicted state, can be transmitted to the protection device or to a display device which is formed separately from the protection device and which can be associated with the voltage grid in which the protection device is incorporated. If the evaluation result is transmitted to the protection device, a suitable bidirectional communication is produced between the protection device and the evaluation unit, even if this is effected via unidirectional communication interfaces.

For example, the evaluation result or a data representation thereof is displayed on the protection device itself or on the display device formed separately from the protection device, thereby informing a user or operator of the monitoring system. The operator or user can then initiate appropriate measures to prevent a failure of the protection device and/or to minimize the downtime or to stabilize the voltage grid so that a predicted poor grid quality can be counteracted.

Furthermore, the evaluation unit may determine an evaluation result, in particular an output value and/or a state. The evaluation unit transmits the evaluation result back to the protection device or a display device, with the evaluation result being output. This ensures that the evaluation result (which is easy for the user to comprehend) is output, for example, at the location of the protection device, for example by the protection device itself, in particular a display of the protection device, or by a display device formed separately therefrom and arranged in the area of the protection device.

In principle, it is therefore possible that a future grid quality and/or the state of the protection device is estimated or predicted on the basis of historical and/or current data, so that the grid operator of the voltage grid and/or the electricity customer/electricity user is enabled to identify future disturbances at an early stage. In other words, the grid operator and/or the electricity customer/electricity user can predict a point in time of an upcoming grid disruption and the intensity thereof. This allows appropriate countermeasures to be initiated in order to avert the upcoming grid disruption, to at least reduce its intensity or generally to minimize the impact of the upcoming grid disruption on certain areas. Likewise, the aging condition (wear) of the protection device can be predicted, which allows an emerging fault in the protection device to be detected at an early stage.

Due to volatile voltage grids, it is often more critical for the grid operator and/or the electricity customer/electricity user how the voltage grid will behave in the future in terms of its grid quality (grid state) than the current grid state, which can no longer be reacted to in any case. This applies analogously to the protection device, the serviceability of which is to be ensured for the future. In fact, looking into the future makes it possible to initiate suitable measures in good time to counteract the predicted grid disruption, that is, the deteriorated state of the voltage grid and/or the failure of the protection device.

In other words, the grid operator and/or the electricity customer/electricity user is thus enabled to design the voltage grid to be more resilient to disruptions to be expected in the future and/or to replace the protection device.

The future state of the voltage grid and/or of the protection device can be predicted for the next few hours, days or weeks, so that the grid operator and/or the electricity customer/user is given sufficient time to initiate any countermeasures in good time so that they can still counteract a predicted disruption or deterioration.

The countermeasures to be taken with regard to the voltage grid may, for example, consist in avoiding further loads in a predicted phase of weakness of the voltage grid, thereby ensuring fail-safe operation of devices and/or machines the operation of which should not be disrupted. In this respect, the countermeasure may consist in disconnecting any machines or devices that are not absolutely necessary from the grid during the predicted phase of weakness in the voltage grid or in not connecting them to the voltage grid in order to reduce the load or not to increase it further. In respect of a predicted fault of the protection device, the countermeasures may consist in that a replacement device is procured and installed in good time before the protection device actually fails.

Generally, the voltage grid may be a local grid, also referred to as a building grid, which is associated with a private household or an industrial building. The voltage grid may thus be a low-voltage grid, for example a building grid that is connected to a power supply grid.

For the prediction, the state value may be acquired and transmitted to the evaluation unit multiple times, i.e. at least at two different points in time, wherein the values acquired at the different points in time can be fed into the processor unit of the evaluation unit for evaluation. It can thus predict the future time profile from a time profile of the state values that was recorded in the past and that can extend up to the present. The future time profile may relate here to the acquired state value itself, so that the future time profile thereof is predicted, which corresponds to the predicted future state of the voltage grid or the protection device.

When evaluating additional data relating to the state value, there may be a data fusion of two different quantities, which allows a look into the future of the respective state. In other words, when the two different quantities are processed together, a correlation of these quantities with each other is made use of, which allow conclusions to be drawn about the future behavior.

The artificial intelligence may receive the state value acquired at at least two different points in time as an input quantity and output the future state as an output quantity. The artificial intelligence may therefore have been trained to recognize the corresponding correlation of the values of the state value that have been acquired at the different points in time among each other and to learn respective technical relationships, as a result of which reliable and/or very accurate predictions regarding the future state of the voltage grid or the protection device are possible.

In particular, a method of training an artificial intelligence for predicting a future state of a voltage grid or of a protection device is therefore also provided. The method of training comprises the steps of:

providing a training data set for the artificial intelligence, which comprises at least a state value at a first point in time, the state value at a second point in time, and an actual state of the voltage grid or the protection device at a third point in time, which is later in time than the first point in time and the second point in time;

feeding the state value at the first point in time and the state value at the second point in time into a processor unit which includes the artificial intelligence to be trained, wherein the processor unit including the artificial intelligence processes the state value acquired at the different points in time together and outputs a predicted future state of the voltage grid or of the protection device at the third point in time;

comparing the predicted future state of the voltage grid or the protection device at the third point in time with the actual state of the voltage grid or the protection device at the third point in time, which is part of the training data set, in order to determine a deviation between the predicted future state of the voltage grid or the protection device at the third point in time and the actual state of the voltage grid or the protection device at the third point in time; and feeding back the deviation between the predicted future state of the voltage grid or the protection device at the third point in time and the actual state of the voltage grid or the protection device at the third point in time in order to adjust weighting factors of the artificial intelligence to be trained, if the deviation is outside a tolerance range.

The artificial intelligence can therefore be appropriately trained using at least one training data set, which comprises the state value both at a first point in time and at a second point in time, in particular a corresponding time sequence or time series of the state value, as well as an actual future state of the voltage grid or of the protection device, which is available at the third point in time, which in terms of time is after the points in time at which the state value was determined or acquired. In particular, the first point in time and the second point in time do not coincide, so that the state value has been acquired at two different points in time.

In principle, when training the artificial intelligence, it may also be provided that the artificial intelligence does not output the state of the voltage grid or the protection device at a discrete point in time, but at an interval that comprises the third point in time, i.e. predicts the future state of the voltage grid or the protection device for a future period of time.

The respective tolerance range for the deviation may be predefined and/or specified by a user, for example as a percentage or variance.

Generally, an artificial intelligence trained by means of the method described above may be used to predict the future state of the voltage grid or the protection device, that is, for evaluation of the state value that has been transmitted to the evaluation unit.

In other words, the processor unit comprises a trained artificial intelligence, in particular an artificial intelligence trained in accordance with the method described above.

One aspect provides that the artificial intelligence includes at least one artificial neural network, for example an artificial recurrent neural network (RNN) or an artificial convolutional neural network (CNN). The artificial intelligence may include a long short-term memory (LSTM) network or a gated recurrent unit (GRU). Such neural networks allow a prediction of a state in the future based on time series and/or time sequences. Accordingly, the artificial intelligence learns from past data (historical data), with the artificial intelligence predicting the future state of the voltage grid or the protection device.

Figure 2:
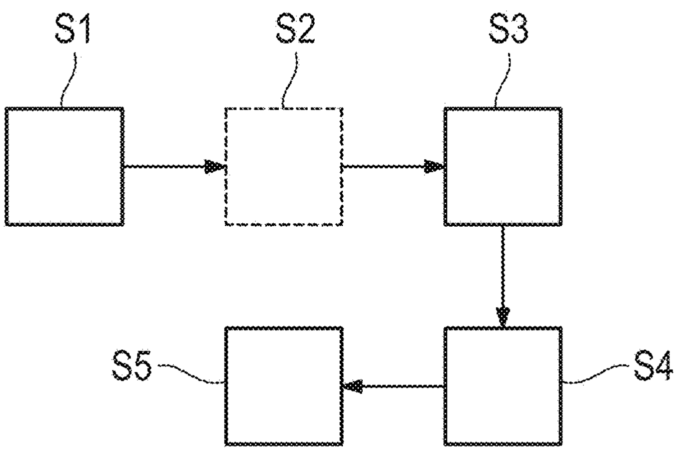

Further advantages and features of the invention will be apparent from the description below and from the drawings, to which reference is made and in which:

FIG. 1 shows a schematic illustration of a monitoring system according to the invention; and FIG. 2 shows an overview of the method according to the invention for monitoring a voltage grid.

FIG. 1 shows a monitoring system 10 that is provided for monitoring a voltage grid 12, which is a building grid or low-voltage grid that is connected to a power supply grid 14.

In the embodiment shown, the voltage grid 12 is shown as a multiphase building grid or low-voltage grid.

The monitoring system 10 comprises a protection device 16, which is incorporated in the voltage grid 12. The protection device 16 is in the form of a surge protection device (SPD), which is also referred to as a surge arrester.

In this respect, the protection device 16 comprises a triggering protection component 18 which, in a triggering event, changes to a conductive or quasi-conductive state in order to discharge an overvoltage that occurs in the case of an overvoltage event such as a lightning strike, in which a respective current can be discharged, whereby any devices incorporated in the voltage grid 12 are appropriately protected. After the overvoltage event has ended, the protection device 16 or the triggering protection component 18 returns to its initial state. The triggering protection component 18 may be formed as a horn gap or spark gap or as a gas discharge tube (GDT).

Furthermore, in the embodiment shown, the protection device 16 comprises, in addition to the triggering protection component 18, a voltage-limiting protection component 20, which is connected in series with the triggering protection component 18. For example, the voltage-limiting protection component 20 is constructed in the form of a metal oxide varistor.

Furthermore, it is provided that the protection device 16 includes an integrated measuring and/or sensor unit 22, which is arranged in the protection device 16. This means that both the triggering protection component 18, the optionally provided voltage-limiting protection component 20 and also the optionally provided measuring and/or sensor unit 22 are surrounded by a housing 24 of the protection device 16. In other words, the housing 24 surrounds the aforementioned components 18 to 22, thereby protecting them from the environment.

In addition, the protection device 16 comprises a communication interface 26, which the protection device 16 uses for establishing a communication link 28 with a separately formed evaluation unit 30, which also includes a respective communication interface 32. The communication interface 26 of the protection device 16 is at least partially received in the housing 24, so that it is also protected from environmental influences.

The separately formed evaluation unit 30 is part of the monitoring system 10; the separately formed evaluation unit 30 does not have to be provided at the same location as the protection device 16, but is arranged, for example, in a different room or a different building.

In particular, the evaluation unit 30 may be configured as a server-based evaluation unit, that is, in a cloud. In this respect, the communication link 28 between the protection device 16 and the evaluation unit 30 is established via an Internet connection.

If the separately formed evaluation unit 30 is provided at the location of the protection device 16, the corresponding communication link 28 may be formed by a Bluetooth connection or the like, in particular a wireless communication link that has a short range.

Generally, the communication link 28 between the protection device 16 and the separately formed evaluation unit 30 can be a wired connection, for example via Ethernet cable, or a wireless connection, for example via Wi-Fi.

The communication interfaces 26, 32 of the protection device 16 and of the evaluation unit 30 may each be designed as bidirectional communication interfaces, so that bidirectional communication between the protection device 16 and the evaluation unit 30 is possible.

Alternatively, both the protection device 16 and the evaluation unit 30 may each include two communication interfaces which only allow a unidirectional communication link, so that two unidirectional communication links 28 are provided between the protection device 16 and the evaluation unit 30. Altogether, this again results in bidirectional communication between the protection device 16 and the evaluation unit 30. This embodiment having separate communication interfaces is of importance in particular if the data transfer in one direction is intended to have a different protocol or a different security level than the data transfer in the respective other direction.

It may, however, also be provided that the protection device 16 has only one unidirectional interface as a communication interface, via which the protection device 16 can only transmit data to the evaluation unit 30. In other words, the protection device 16 is then not configured to receive data from the evaluation unit 30. This means that the communication link 28 is then provided between the one unidirectional interface and the at least one communication interface 32 of the evaluation unit 30.

Generally, it is possible for the protection device 16 to transmit a state value to the separately formed evaluation unit 30 via the communication link 28, so that the evaluation unit 30, which includes a processor unit 34, is configured to process the respective state value to obtain an evaluation result, for example an output value, and/or to predict a state, which will be discussed in detail below.

The evaluation unit 30 can subsequently transmit the evaluation result via the communication link 28 back to the protection device 16, provided that the latter is configured to receive data, as is shown in the embodiment according to FIG. 1.

The protection device 16 may include a display 36 that is connected to the communication interface 26 in a signal-transmitting manner, so that the evaluation result transmitted by the evaluation unit 30 can be displayed by means of the display 36 of the protection device 16. The display 36 may be a screen. The evaluation result itself, i.e. the output value or the predicted state, or a data representation thereof, can be displayed accordingly.

Alternatively, provision may be made that the evaluation unit 30 does not transmit the evaluation result directly to the protection device 16, but to a separately formed display device 38, which includes a corresponding communication interface 40 which is used by the display device 38 to communicate with the evaluation unit 30, in particular the communication interface 32 of the evaluation unit 30. This is the case in particular if the protection device 16 itself is not designed for data reception, as it only has a unidirectional communication interface, for example, which is only intended for data transmission, that is, to transmit the state value to the evaluation unit 30.

The display device 38 also includes a display 42 which can be used for displaying the respective evaluation result, in particular a data representation thereof, in order to inform a user or operator of the monitoring system 10 accordingly in this way. The display 43 of the display device 38 may also be in the form of a screen.

In principle, the data representation may also comprise recommendations for action or the like, so that the user or operator is instructed to take certain actions which are intended, for example, to counteract a predicted state of the voltage grid 12 and/or of the protection device 16.

The state value transmitted by the protection device 16 may be a measured value acquired by the protection device 16 or a value representative of a triggering state of the triggering protection component 18 of the protection device 16.

The respective measured value may be a measured value that has been acquired or captured by the measuring and/or sensor unit 22. In particular, the measured value then is a value of a characteristic parameter of the voltage grid 12. The characteristic parameter of the voltage grid 12 may be a voltage, a current, a power, a frequency, a distortion (total harmonic distortion—THD), a harmonic (up to the 50th harmonic), a reactive power, and/or an energy value.

The value representative of the triggering state of the triggering protection component 18 may be binary, i.e. "0" for a non-tripped state and "1" for a tripped state.

The protection device 16 hereby transmits appropriate information and data to the evaluation unit 30, which can be utilized by the evaluation unit 30 to determine an aging state of the protection device 16 in general or a state of the voltage grid 12, in particular to predict a respective future state of the protection device 16 and/or the voltage grid 12.

Basically, the evaluation unit 30 can furthermore communicate with at least one further device, for example a database 44, a measuring device 46 which is provided separately from the voltage grid 12, i.e. does not acquire any data or information of the voltage grid 12, a measuring device 48 which is formed separately from the protection device 16 but acquires information or data of the voltage grid 12, and/or a further protection device 16 which is associated with a different voltage grid.

The evaluation unit 30 thus receives further input data that can also be taken into account for the evaluation of the state value of the protection device 16, so that a joint evaluation of different data is performed, which allows, for example, correlations between the different data to be identified.

In particular, the evaluation unit 30, i.e. the processor unit 34, includes an artificial intelligence 50 that is configured to predict a (future) state of the voltage grid 12 and/or a (future) state of the protection device 16, at least based on the state value obtained from the protection device 16.

This can be used to carry out a failure prediction of the protection device 16 or the voltage grid 12. Likewise, an aging state of the protection device 16 and/or other events in the voltage grid 12 can be predicted, for example the future grid quality of the voltage grid 12. This is done on the basis of the input data processed by the artificial intelligence 50.

Using the artificial intelligence 50, large amounts of data, in particular data of different types and/or origins, can be processed together and relationships (correlations) between the different data can be identified, so that in-depth analyses are possible, which cannot easily be carried out on site because of the computing power required.

Generally, the processor unit 34 of the evaluation unit 30 may be configured to execute a computer program having program code means in order to monitor the voltage grid 12.

Here, the computer program may have been installed on the processor unit 34 by a computer-readable data carrier which has the computer program stored thereon, so that the monitoring system 10, in particular the evaluation unit 30 including the processor unit 34, is able to carry out a respective method of monitoring the voltage grid 12.

Accordingly, the evaluation unit 30 includes a suitable interface by means of which the data carrier can be coupled to the evaluation unit 30 in order to install the computer program.

The computer program may also have been transmitted via a data transfer device which is, for example, in the form of a communication interface, for example for wireless communication. It may also be a LAN interface via which communication is possible.

The method carried out by means of the computer program will be discussed below with reference to FIG. 2.

In a first step S1, at least one state value is acquired by means of the protection device 16 at a first point in time. This may be effected by means of the triggering protection component 18, the voltage-limiting protection component 20 and/or the measuring and/or sensor unit 22. In any case, it is ensured that the protection device 16 acquires the state value.

In a second step S2, which is optional, the state value is acquired by the protection device 16 at a second point in time, which is different from the first point in time.

In principle, the state value may be acquired at several points in time. The state value is thus acquired several times in chronological succession, in particular periodically, so that a time series/time sequence of the state value is available.

In a third step S3, the state value acquired at least once by the protection device 16 is transmitted to the evaluation unit 30, in particular the processor unit 34, in order that the state value can be evaluated.

It may be supplementarily provided that at least one second quantity is acquired, for example a characteristic parameter of the voltage grid 12, a value from the database 44, a value of a measuring device 46, 48, or a state value of another protection device 16. The second quantity is different from the state value. The second quantity may therefore be acquired independently of the voltage grid 12, for example read out from the database 44 to which the evaluation unit 30 has access, in particular by means of the communication interface 32. From the database 44, data may be obtained which is included for analysis, for example environmental data such as weather data, time data (working day, weekend, public holiday, day and/or night) or usage data of systems in the surrounding area, for example a timetable for trains or usage data of electric charging systems in the surrounding area. This allows additional information to be obtained that explains any possible difference between the state values at the different points in time.

The second quantity obtained from the database 44 is transferred to the processor unit 34 of the evaluation unit 30, so that the processor unit 34 records the second quantity of the voltage grid 12.

But the second quantity may also be a characteristic parameter of the voltage grid 12, which is acquired by one of the measuring devices 46, 48 or the other protection device 16, wherein the characteristic parameter is transferred to the processor unit 34 of the evaluation unit 30, so that the processor unit 30 acquires the characteristic parameter of the voltage grid 12.

If the state value of the protection device 16 is also a characteristic parameter, two characteristic parameters can therefore be determined, which differ from one another.

In principle, the respective characteristic parameter of the voltage grid 12 may be a voltage, a current, a power, a frequency, a distortion, a harmonic, a reactive power and/or an energy value of the voltage grid 12, in particular of a phase of the multiphase voltage grid 12.

As already mentioned above, a time series/time sequence of the state value may be acquired. This may also apply to the optionally acquired second quantity, which is therefore acquired multiple times, in particular periodically.

For example, the second quantity is always also acquired when the state value is acquired, so that they are acquired in parallel, in particular at the same time.

This means in particular that when the state value is acquired at the different points in time, a corresponding data set is also read out from the database 44 each time, which represents the second quantity, for example the weather data available at the respective points in time.

In a fourth step S4, at least the state variable is fed into the processor unit 34, i.e. the artificial intelligence 50.

In particular, the state variable acquired at the first point in time, the state variable acquired at the second point in time and the second quantity are fed as input quantities into the artificial intelligence 50, which processes the input quantities together, so that based on the state value acquired at the at least two different points in time, a (future) state of the voltage grid 12 and/or a (future) state of the protection device 16 is predicted by the processor unit 34, in particular the artificial intelligence 50.

For prediction, the processor unit 34 includes an artificial intelligence 50, which receives at least the state value, in particular the state value acquired at the at least two different points in time and the second quantity as an input quantity and outputs the future state of the voltage grid 12 or the protection device 16 as an output quantity. The output quantity therefore corresponds to the evaluation result of the evaluation unit 30.

The artificial intelligence 50 may comprise at least one artificial neural network, for example a convolutional neural network (CNN) or an artificial recurrent neural network (RNN), such as a long short-term memory (LSTM) network or a gated recurrent unit (GRU).

Accordingly, the artificial intelligence 50 is able to predict a future state of the voltage grid 12 and/or the protection device 16 on the basis of at least the time series obtained, i.e. the time sequence of the state value. To this end, the artificial intelligence 50 processes at least the state value that was acquired in particular at different points in time, and optionally the second quantity, for example the value from the database 44, the measured value of the measuring device 46, 48, and/or the value of the other protection device 16.

The artificial intelligence 50 may have been previously trained by means of a method in which the artificial intelligence 50 was trained to predict the (future) state of the voltage grid 12 and/or the protection device 16 based on the state value that was acquired in particular at at least two different points in time. Therefore, the artificial intelligence 50 is a trained artificial intelligence 50.

In a first training step, a training data set for the artificial intelligence 50 is provided, which comprises at least the state value at a first point in time, the state value at a second point in time, and an actual state of the voltage grid 12 or the protection device 16 at a third point in time. The third point in time here is later than the first point in time and the second point in time, so that it is a future point in time to be predicted, proceeding from the first point in time and the second point in time.

In addition, the training data set may contain a second quantity that is different from the state value, so that the training data set comprises at least two different quantities. The second quantity may be a characteristic parameter of the voltage grid 12 that is different from the state value. The second quantity may, however, also correspond to a measured value of a measuring device 46, 48 or a value from a database 44.

In particular, the training data set may comprise a time series or time sequence of the state value, so that the state value was measured or acquired at different points in time.

The optionally provided second quantity may also be contained in the training data set as a time series or time sequence. The training data set may thus comprise data of at least two different quantities for a particular period of time as well as information on the state of the voltage grid 12 or the protection device 16 that was obtained at a later point in time than the particular period of time.

But it is also possible for the training data set to comprise respective information of more than only two different quantities, whereby more information and/or data is made available altogether, as a result of which the training is more comprehensive and the informational value of the appropriately trained artificial intelligence 50 is higher.

In a second training step, at least the state value acquired at the first point in time and the state value acquired at the second point in time, in particular the time series or time sequence of the state value, are fed into the processor unit 34, which includes the artificial intelligence 50 to be trained. The processor unit 34 including the artificial intelligence 50 processes the state value acquired at the different points in time, in particular the time series or time sequence, together and outputs a predicted future state of the voltage grid 12 or the protection device 16 at the third point in time, at which the training data set comprises the actual state of the voltage grid 12 or the protection device 16.

Accordingly, during the training, the artificial intelligence 50 learns respective relationships between the state value acquired at the first point in time and the state value acquired at the second point in time and the effect(s) on the later state of the voltage grid 12 or the protection device 16, so that the artificial intelligence 50 is trained to predict the future state of the voltage grid 12 or the protection device 16 on the basis of the past and/or current data.

In addition, the second quantity may optionally be incorporated, whereby correlations between the different quantities are recognized during training, that is, correlations between the state value, which was acquired at the different points in time, and the second quantity, which was acquired once or also at the different points in time.

In a third training step, the predicted future state of the voltage grid 12 or the protection device 16 at the third point in time is compared with the actual state of the voltage grid 12 or the protection device 16 at the third point in time, wherein the latter was contained in the training data set. Using the comparison, a deviation between the predicted future state of the voltage grid 12 or the protection device 16 and the actual state of the voltage grid 12 or the protection device 16 is determined. In this respect, it is determined during the training how accurate the prediction made by the artificial intelligence 50 already is, i.e. how well the prediction matches the actual state.

In a fourth training step, the determined deviation between the predicted future state of the voltage grid 12 or the protection device 16 and the actual state of the voltage grid 12 or the protection device 16 is fed back into the artificial intelligence 50 to be trained, in order to adjust weighting factors of the artificial intelligence 50 to be trained, if the deviation is outside a tolerance range. The tolerance range may have been predefined here and/or set by a user.

Subsequently, at least the third training step is repeated, with the deviation determined during the comparison in the third training step being increasingly reduced. After a certain number of repetitions (iterations), the deviation is so small that the deviation is within the tolerance range so that the deviation will no longer be fed back. The artificial intelligence 50 has then reached an at least (pre-)trained state for the training data set so that it can be used.

The artificial intelligence 50 may subsequently be further trained using the same training steps with appropriate iterations, so that the artificial intelligence 50 is trained, for example, on further quantities, in particular characteristic parameters of the voltage grid 12 and/or different pairings of quantities.

In particular, the training of the artificial intelligence 50 may also comprise the feeding in of more than two different quantities, for example up to eight different quantities or more. The respective training set used for this purpose therefore includes more data, which is provided and fed in.

Typically, the training steps are thus repeated for a plurality of different actual states of the voltage grid 12 or the protection device 16 and/or a plurality of different data of the quantities in order to train the artificial intelligence 50. In the final training step, as already described, the weighting factors of the artificial intelligence 50 to be trained are adjusted such that the respectively predicted future state of the voltage grid 12 or the protection device 16 is always within the tolerance range.

The artificial intelligence 50 used in the method of monitoring the voltage grid 12 has been trained in accordance with the aforementioned training method, so that it is a trained artificial intelligence 50 that determines and/or predicts the (future) state of the voltage grid 12 or the protection device 16 based on at least the state value that was acquired by the protection device 16.

Accordingly, the processor unit 34, which comprises the trained artificial intelligence 50, outputs the evaluation result, for example the predicted future state of the voltage grid 12 or the protection device 16, in a fifth step S5.

Here, the evaluation result may be transmitted to the protection device 16, which receives the data via the communication interface 26 and passes it on to the display 36, so that the evaluation result or a data representation thereof is output on the protection device 16 itself, in particular is displayed. In addition to the evaluation result, a recommendation for action may also be comprised.

As an alternative to the protection device 16, the evaluation result may also be transmitted to the separately formed display device 38, so that the evaluation result and any recommendation for action are output on the display device 38, in particular on the display 42 of the display device 38.

Since the evaluation unit 30 is formed separately from the protection device 16, the evaluation unit 30 may be configured as a high-performance computer. In any event, it is possible for the evaluation unit 30 to carry out computationaly intensive evaluations in order to then transmit the evaluation result to the protection device 16 itself or to the separately formed display device 38.

The invention claimed is:

1. A monitoring system for monitoring a voltage grid (12), the monitoring system (10) including a protection device (16) which is to be incorporated into the voltage grid (12) and which comprises at least one triggering protection component (18), the protection device (16) including at least one communication interface (26) that is configured to transmit a state value of the protection device (16) to an evaluation unit (30) formed separately from the protection device (16), and the evaluation unit (30) being configured to perform an evaluation, so that an outsourced evaluation is provided, wherein the protection device (16) includes at least one display (36) which is configured to display an evaluation result of the evaluation unit (30).

2. The monitoring system according to claim 1, characterized in that the state value of the protection device (16) is a measured value acquired by the protection device (16) or a value representative of a triggering state of the triggering protection component (18) of the protection device (16).

3. The monitoring system according to claim 1, characterized in that the protection device (16) is a surge protection device.

4. The monitoring system according to claim 1, characterized in that the monitoring system (10) comprises an evaluation unit (30) which is formed separately from the protection device (16) and which includes at least one communication interface (32) that is configured to communicate with the communication interface (26) of the protection device (16), in particular wherein the communication interface (26, 32) is formed as a bidirectional communication interface.

5. The monitoring system according to claim 1, characterized in that the evaluation unit (30) is configured to receive input data from at least one database (44) or from a measuring device (46, 48).

6. The monitoring system according to claim 1, characterized in that the evaluation unit (30) includes at least one processor unit (34) which is configured to process at least the state value obtained from the protection device (16).

7. The monitoring system according to claim 6, characterized in that the processor unit (34) comprises an artificial intelligence (50) which is configured to predict a state of the voltage grid (12) and/or a state of the protection device (16) on the basis of the state value obtained from the protection device (16).

8. The monitoring system according to claim 1, characterized in that the separately formed evaluation unit (30) is configured to determine an evaluation result, in particular an output value and/or a state, based on the state value of the protection device (16).

9. The monitoring system according to claim 8, characterized in that the separately formed evaluation unit (30) is configured to transmit the evaluation result determined to the protection device (16) or a display device (38).

10. The monitoring system according to claim 1, characterized in that the display (36) is connected to the communication interface (26) of the protection device (16) in a signal-transmitting manner.

11. The monitoring system according to claim 1, characterized in that there is no direct signal transmission between the at least one triggering protection component (18) and the display (36).

12. The monitoring system according to claim 1, characterized in that the protection device (16) includes a housing (24), in which at least the triggering protection component (18) and the communication interface (26) are at least partially accommodated.

13. A method of monitoring a voltage grid (12) by means of a monitoring system (10), comprising the steps of:

acquiring a state value by means of a protection device (16) which is incorporated in the voltage grid (12) to be monitored;

transmitting the acquired state value to an evaluation unit (30) that is formed separately from the protection device (16);

processing the transmitted state value by means of the evaluation unit (30), so that an outsourced evaluation is effected; and determining an evaluation result by means of the evaluation unit (30) that transmits the evaluation result back to the protection device (16) that includes at least one display (36) which displays the evaluation result of the evaluation unit (30).

14. A monitoring system for monitoring a voltage grid (12), the monitoring system (10) including a protection device (16) and an evaluation unit (30) which is formed separately from the protection device (16) which is to be incorporated into the voltage grid (12), the protection device (16) comprising at least one triggering protection component (18), the protection device (16) including at least one communication interface (26) that is configured to transmit a state value of the protection device (16) to the evaluation unit (30) which includes at least one communication interface (32) that is configured to communicate with the communication interface (26) of the protection device (16), and the evaluation unit (30) being configured to perform an evaluation, so that an outsourced evaluation is provided, wherein the monitoring system (10) includes a display device (38) that is separately formed with respect to the protection device (16) and the evaluation unit (30), wherein the display device (38) includes a communication interface (40) which is used by the display device (38) to communicate with the communication interface (32) of the evaluation unit (30), and wherein the evaluation unit (30) is configured to transmit the evaluation result to the display device (38) so that the evaluation result is displayed by the display device (38).

* * * * *